April 2, 1968 W. RIZK ET AL 3,376,017

TURBINES

Filed Sept. 16, 1965 2 Sheets-Sheet 1

United States Patent Office 3,376,017

Patented Apr. 2, 1968

3,376,017

TURBINES

Waheeb Rizk, Roy Bolesworth, Clifford Arthur Keer, and John Charles Waldron, Whetstone, England, assignors to The English Electric Company Limited, London, England, a British company Filed Sept. 16, 1965, Ser. No. 487,669

Claims priority, application Great Britain, Sept. 25, 1964, 39,144/64

27 Claims. (Cl. 253—39)

ABSTRACT OF THE DISCLOSURE

A turbine has two gas inlets feeding gas into an annular inlet liner which has an annular outlet through which the gas flows to the turbine stator and rotor blades. The gas inlets extend in a direction transverse to the vertical center line of the turbine and are symmetrically disposed one on either side of the vertical center line. The annular inlet liner is mounted within an outer pressure-containing casing so that relative thermal expansion of the annular inlet liner and the outer pressure-containing structure is accommodated while the concentricity of the annular inlet liner and the turbine stator and rotor blades is maintained. The outer pressure-containing structure is mounted so as to be freely capable of radial expansion relative to the inner structure within which the turbine rotor is mounted.

*Specification*

This invention relates to turbines.

According to this invention, a turbine includes rotor blades, stator blades through which gas is fed to the rotor blades, an inner structure, an outer pressure-containing structure mounted to be capable of radial expansion relative to said inner structure, an inlet liner mounted within said outer structure and defining an annular chamber having an annular outlet passage which co-operates with the stator blades, and means supporting said inlet liner including first axially-extending flexible mounting means interconnecting an outer part of said liner with said outer structure to allow relative thermal expansion of said liner and said outer structure in the radial direction, and also including an annular structure secured at its downstream end to said inner structure and in gas-sealing engagement at its upstream end with an inwardly-extending part of said outer structure, and annularly-extending tie means connected between said annular structure at or near the upstream end thereof and said inlet liner at or near the downstream end thereof, and gas sealing means between the downstream end of said inlet liner and said inner structure.

Figure 1:
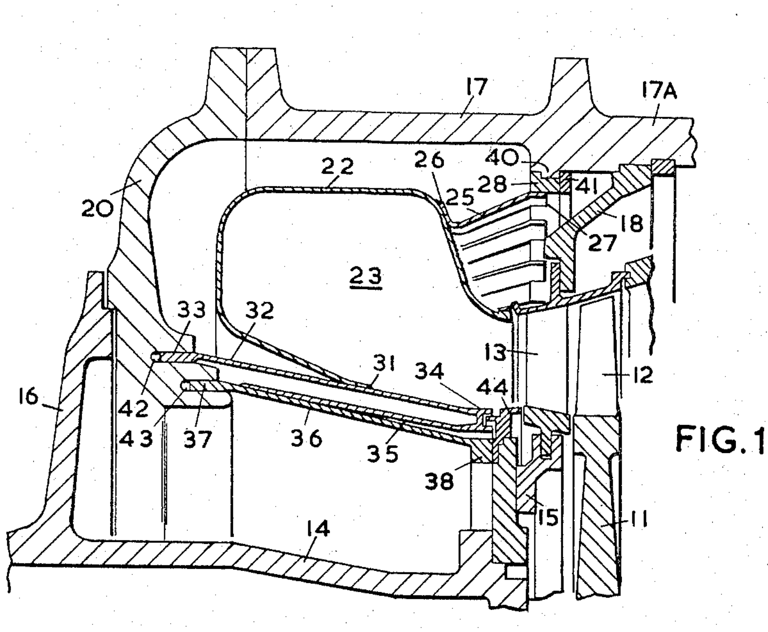
Figure 2:
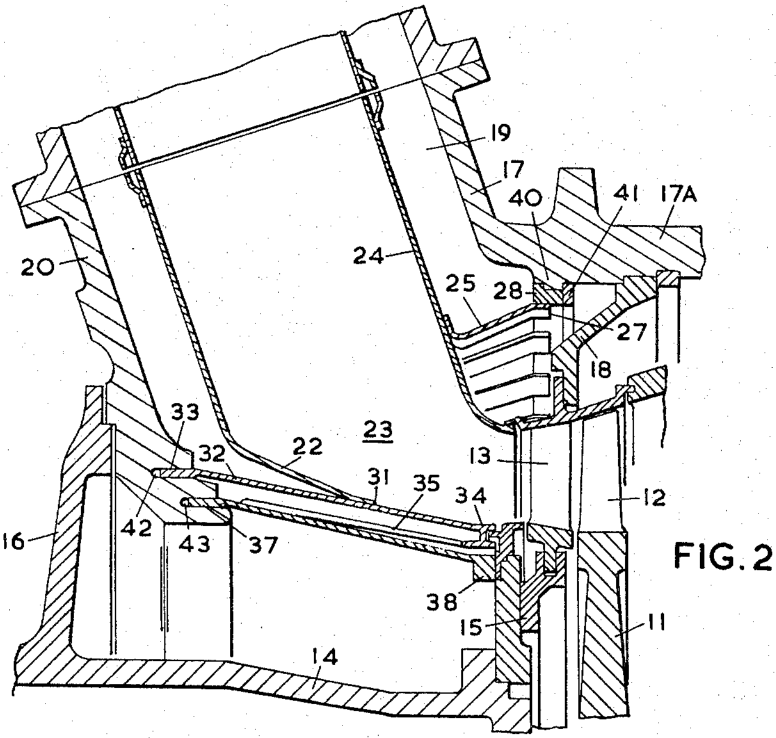
Figure 3:
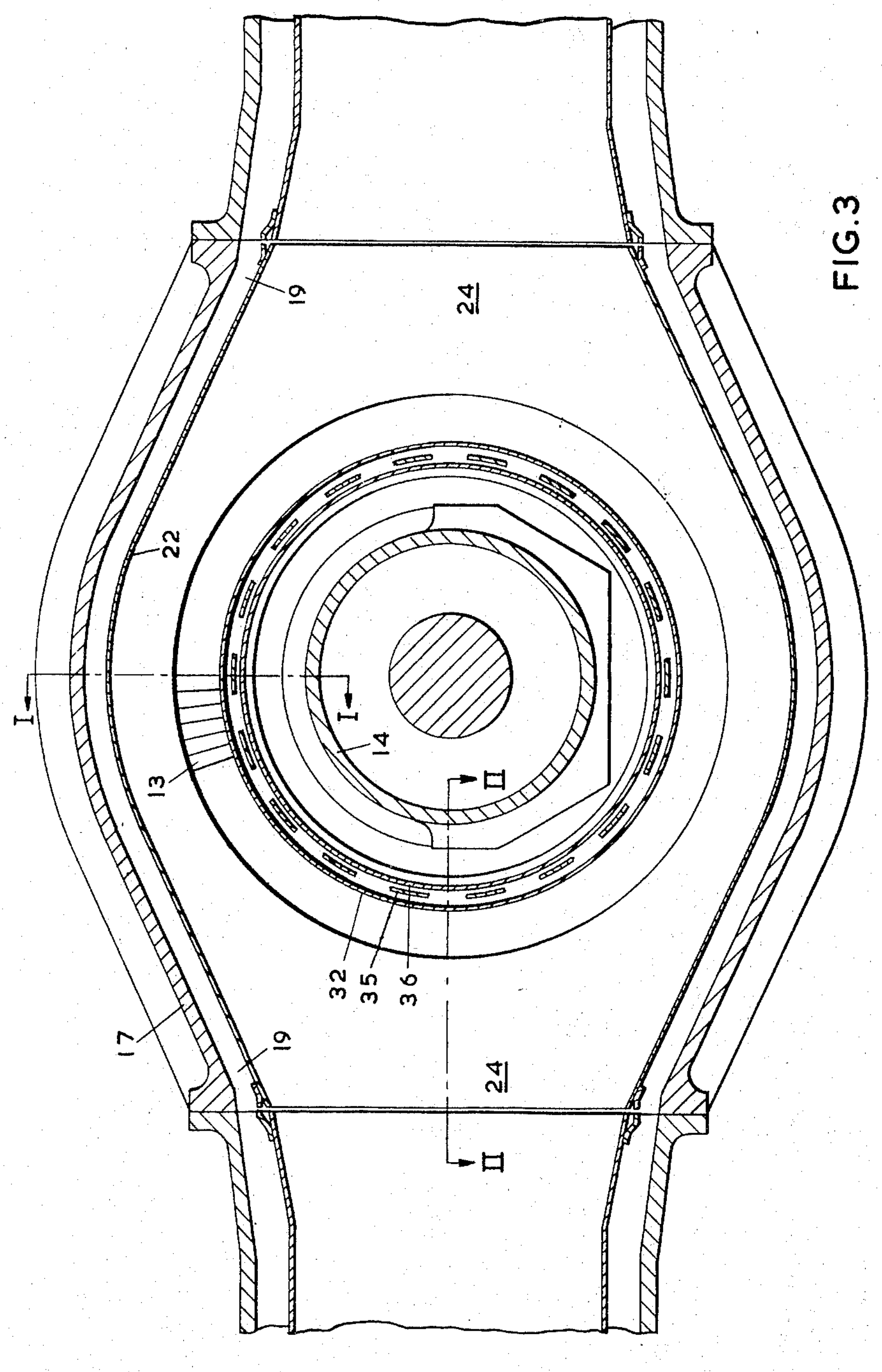

One embodiment of this invention will now be described with reference to the accompanying drawings, of which:

FIG. 1 is a cross-section on the vertical centre-line of the turbine, on the line I—I of FIG. 3, FIG. 2 is a cross-section on the horizontal centre-line of the turbine, on the line II—II of FIG. 3, and FIG. 3 is a transverse section of the turbine.

Referring to the drawings, the turbine comprises a rotor including a disc 11 on which rotor blades 12 are mounted, and stationary structure including stator blades 13 arranged in a ring round the axis of rotation of the rotor, on which axis the center-lines intersect. The rotor will not be described in detail, since its detailed construction does not form part of the present invention, but the rotor is mounted in bearings in a stationary casing 14, which supports it for rotation.

The inner ends of the stator blades 13 are mounted in annular structure 15, which is secured to the stationary casing 14; the latter has a circular outwardly-directed flange 16 spaced from the structure 15. The outer casing

17 has a circular downstream portion 17A, and the outer ends of the stator blades 13 are connected to annular structure 18 which is mounted in any known or convenient manner in this portion 17A.

There are two inlets 19 for the turbine working fluid, symmetrically disposed one on either side of the vertical center-line; the inlets are approximately oblong, the major dimension being vertical. The outlet for the working fluid, downstream of the turbine, is circular.

Bolted to the upstream end of the outer casing 17 is an end casing member 20 which forms part of the end wall of the turbine casing on the upstream side of the turbine, and also forms one side (the left-hand side as seen in FIG. 2) of each of the inlets 19. This end casing member 20 has spigoted engagement with the flange 16, the end casing member 20 surrounding part of the flange 16 so that it can expand freely outwards.

The outer casing 17 and end casing 20 together form part of the pressure-containing structure for the turbine working fluid.

Within the outer casing 17 there is mounted an inlet liner 22, which defines an annular chamber 23 of which the outlet passage co-operates with the stator blades 13. The liner is of welded sheet-metal construction and has a pair of inlet portions 24 which extend within the oblong inlets 19 defined between casing parts 17, 20.

The liner 22 is mounted in the outer casing 17 in the following manner. A circumferentially-extending series of straps 25 are welded (as shown at 26) to the liner 22 concentrically with the outlet passage from chamber 23, and at a greater diameter, and the other ends of these straps are welded (as shown at 27) to a continuous steel ring 28. The inner circumference of the liner 22 is welded, as shown at 31, to a frusto-conical member 32 having a small apex angle and made of a material having a relatively high coefficient of thermal expansion, for example, austenitic steel. The larger-diameter end of the member 32 is formed with a thickened end ring 33, and its other end is welded to a substantially H-section ring 34, to one arm of which is welded a number of circumferentially-extending straps 35. These straps are made of a material of moderate coefficient of thermal expansion, for example, Nimonic (registered trademark), and lie on the surface of a cone having an apex angle similar to the apex angle of the frusto-conical member 32; the other ends of the straps 35 are welded to a further frusto-conical member 36, on the adjacent end of which is formed a thickened ring 37. The inner frusto-conical member 36 is made of a metal of relatively low coefficient of thermal expansion, for example, ferritic steel. The smaller-diameter end of the frusto-conical member 36, which has a slightly greater apex angle than the conical surface on which the straps 35 lie, is formed with a substantial rectangular-section ring 38.

The liner 22 is assembled within the outer casing 17 from the upstream end, (i.e. from the left as seen in FIGS. 1 and 2) the ring 28 abutting a flange 40 which extends inwards from the outer casing 17, and being secured to it by means of a further ring 41 bolted to the ring 28.

The ring 38 is bolted to the stationary structure 15, and on assembly of the end casing member 20 to the outer casing 17 the thickened end rings 33, 37 on the upstream end of the liner assembly are received in corresponding circular grooves 42, 43, formed in the thickened inner-diameter part of the end casing member 20. The end casing member 20 is secured to the outer casing 17 by bolts passing through the abutting flanges of the two parts.

The downstream-facing legs of the H-section ring 34 co-operate with a sealing member 44 mounted on the stationary structure 15.

It will be apparent that the frusto-conical member 36 forms the inner pressure-containing member of the structure. It will also be seen that the construction enables relative thermal expansion to be accommodated while maintaining the concentricity of the liner 22 and the turbine rotor blades 12 and stator blades 13.

To reduce the heat input to the pressure-containing members of the structure, e.g. the outer casing 17, these may be lined with blankets of thermally-insulating material.

It will be understood that the space surrounding the inlet liner and radially outside the frusto-conical member 36 is filled substantially with combustion gases at high temperature, whereas the space radially inside the frusto-conical member 36 is filled substantially with air at relatively low temperature.

What we claim as our invention and desire to secure by Letters Patent is:

1. A turbine having casing means, said casing means including a radially-inner structure and a radially-outer pressure-containing structure; a plurality of stator blades mounted within said casing means; a rotor comprising shaft carrying rotor blades, means rotatably mounting said shaft means co-axially within said radially-inner structure; a plurality of gas-inlet means formed in said radially outer pressure-containing structure and each comprising duct means extending in a direction transverse to said shaft means; wherein the improvement comprises:

(1) An inlet liner having radially-inner and outer wall means terminating adjacent said blades, means defining a plurality of openings in said radially-outer wall means, said inlet liner defining an annular chamber, said annular chamber being in communication with each said gas-inlet means through a respective one of said openings whereby gas is adapted to be fed into said annular chamber with a transverse directional component, said annular chamber having a circumferentially continuous annular outlet defined by concentric downstream end portions of said radially-inner and outer wall means for distributing gas from said openings circumferentially as a complete flow annulus;

(2) Gas sealing means between the downstream end of said radially-inner wall means and said radially-inner structure; and (3) Support means which support said inlet liner and which include first axially extending flexible mounting means connected between said radially-outer wall means and said casing means to allow relative thermal expansion of said inlet liner and said radially-outer pressure-containing structure in a radial direction, and second axially extending flexible mounting means connected between said radially-inner wall means and said casing means.

2. A turbine as claimed in claim 1, wherein the improvement further comprises said radially-outer pressure-containing structure having a radially-inwardly-extending part which is in spigotted engagement with said radially-inner structure so as to be capable of radial expansion relative to said radially-inner structure.

3. A turbine having casing means, said casing means including a radially-inner structure and a radially-outer pressure-containing structure; a plurality of stator blades mounted within said casing means; a rotor comprising shaft means carrying rotor blades; means rotatably mounting said shaft means co-axially within said radially-inner structure; gas-inlet means formed in said radially-outer pressure-containing structure and comprising a pair of duct means symmetrically disposed one on either side of a plane through the axis of the turbine and extending in a direction transverse to said plane; wherein the improvement comprises:

(1) An inlet liner having radially inner and outer wall means terminating adjacent said blades, means defining a pair of openings in said radially-outer wall means, said openings being symmetrically disposed one on either side of said plane, said inlet liner defining an annular chamber, said annular chamber being in communication with each said duct means through a respective one of said openings and having a circumferentially continuous annular outlet defined by concentric downstream end portions of said radially inner and outer wall means for distributing gas from said openings circumferentially as a complete flow annulus;

(2) Gas sealing means between the downstream end of said radially inner wall means and said radially inner structure;

(3) Support means which support said inlet liner and which include first axially extending flexible mounting means connected between said radially-outer wall means and said radially-outer pressure-containing structure to allow relative thermal expansion of said inlet liner and said radially-outer pressure-containing structure in the radial drection; and second axially extending flexible mounting means connected between said radially-inner wall means and said radially-outer pressure-containing structure;

(4) An annular structure having an upstream end and a downstream end, the upstream end thereof being engaged in a gas-tight manner with said radially-outer pressure-containing structure and the downstream end being secured to said radially-inner structure, said annular structure forming a circumferentially continuous inner pressure-containing member;

(5) Said radially-outer pressure containing structure being in spigotted engagement with said radially-inner structure so as to be capable of radial expansion relative to said radially-inner structure.

4. A turbine having casing means, said casing means including a radially-inner structure and a radially-outer pressure-containing structure; a plurality of stator blades mounted within said casing means; a rotor comprising shaft means carrying rotor blades, means rotatably mounting said shaft means co-axially within said radially-inner structure; a plurality of gas-inlet means formed in said radially outer pressure-containing structure and each comprising duct means extending in a direction transverse to said shaft means; wherein the improvement comprises:

(1) An inlet liner having radially-inner and outer wall means terminating adjacent said blades, means defining a plurality of openings in said radially-outer wall means, said inlet liner defining an annular chamber, said annular chamber being in communication with each said gas-inlet means through a respective one of said openings whereby gas is adapted to be fed into said annular chamber with a transverse directional component, said annular chamber having a circumferentially continuous annular outlet defined by concentric downstream end portions of said radially-inner and outer wall means for distributing gas from said openings circumferentially as a complete flow annulus;

(2) Gas sealing means between the downstream end of said radially inner wall means and said radially inner structure;

(3) Said radially-outer pressure-containing structure having a radially-inwardly-extending part which is in spigotted engagement with said radially-inner structure so as to be capable of radial expansion relative to said radially-inner structure.

(4) An annular structure having an upstream end and a downstream end, the upstream end thereof being engaged in a gas-tight manner with said radially-inwardly-extending part and the downstream end being secured to said radially inner structure, said annular structure forming a circumferentially continuous inner pressure-containing member; and (5) Support means which support said inlet liner within said radially-outer pressure-containing structure concentrically with said blades and which include a first circumferentially-spaced series of axially-extending straps, each strap being connected between said radially-outer wall means and said radially-outer pressure-containing structure to allow relative thermal expansion of said inlet liner and said radially-outer pressure-containing structure in the radial direction; and a second circumferentially-spaced series of axially-extending straps, each strap being connected between said annular structure adjacent the upstream end thereof and said radially-inner wall means.

5. A turbine as claimed in claim 4 wherein the improvement further comprises said support means also including a member having an upstream end and a downstream end, the downstream end thereof being connected to said second circumferentially-spaced series of axially-extending straps and the upstream end thereof being engaged with said radially-inwardly-extending part.

6. A turbine having a casing means, said casing means including a radially-inner structure and a radially-outer-pressure-containing structure; gas-inlet means formed in said radially-outer pressure-containing structure; a plurality of stator blades mounted within said casing means; a rotor comprising shaft means carrying rotor blades; means rotatably mounting said shaft means co-axially within said radially-inner structure; wherein the improvement comprises:

(1) An inlet liner having radially-inner and outer wall means terminating adjacent said blades, said inlet liner defining an annular chamber, said annular chamber being in communication with said gas-inlet means and having a circumferentially continuous annular outlet defined by concentric downstream end portions of said radially inner and outer wall means for feeding working gas to said blades as a complete flow annulus.

(2) Gas sealing means between the downstream end of said inner wall means adjacent said blades and said radially inner structure; and (3) Support means which support said inlet liner and which include first axially extending flexible mounting means connected between said radially-outer wall means and said radially-outer pressure-containing structure to allow relative thermal expansion of said inlet liner and said radially-outer pressure-containing structure in a radial direction, and second axially extending flexible mounting means connected between said radially-inner wall means and said casing means.

(4) An annular structure having an upstream end and a downstream end, the upstream end thereof being engaged in a gas-tight manner with said radially-outer pressure-containing structure and the downstream end being secured to said radially-inner structure, said annular structure forming a circumferentially continuous inner pressure-containing member.

7. A turbine as claimed in claim 6, wherein the improvement further comprises said radially-outer pressure-containing structure having a radially-inwardly-extending part which is in spigotted engagement with said radially-inner structure so as to be capable of radial expansion relative to said radially-inner structure.

8. A turbine as claimed in claim 7 comprising also a member connected at its downstream end to said second axially-extending flexible mounting means and engaging at its upstream end in said inwardly-extending part of said outer structure, to locate said member against radial movement relative to said inwardly-extending part.

9. A turbine as claimed in claim 7 wherein said annular structure engages at its upstream end in said inwardly-extending part of said outer casing to locate said annular structure against radial movement relative to said inwardly-extending part.

10. A turbine as claimed in claim 6 wherein said first axially-extending flexible mounting means comprises a circumferentially-extending series of straps, each strap having one end welded to said inlet liner and the other end welded to a ring secured to the outer pressure-containing structure.

11. A turbine as claimed in claim 7, wherein said annular structure comprises a frusto-conical member formed at its smaller-diameter end with a thick ring, which is bolted or otherwise secured to said inner structure, and formed at its larger-diameter end with a thickened end ring which is received in a circular groove in the inwardly-extending part of said outer casing.

12. A turbine as claimed in claim 6 wherein said second axially-extending flexible mounting means comprises a plurality of circumferentially-spaced axially-extending straps lying on the surface of a cone, one end of each of said straps being welded to said annular structure at or near the upstream end of said structure, and the other end of each of said straps being welded to a ring at the downstream end of said inlet liner, said ring forming part of said gas-sealing means between the downstream end of said inlet liner and said inner structure.

13. A turbine as claimed in claim 12, wherein said ring is substantially of H section, two arms of the section embracing an annular flange on the inner structure to form said gas-sealing means, and the other two arms of the section being welded respectively to the inlet liner and to the downstream ends of the straps.

14. A turbine as claimed in claim 8, wherein there is provided a frusto-conical member to which the inner circumference of the inlet liner is welded, the larger-diameter end of said frustro-conical member being formed with a thickened end ring which is received in a circular groove in the inwardly-extending part of said outer casing.

15. A turbine as claimed in claim 6, wherein said second axially-extending flexible mounting means are made of a material having a coefficient of thermal expansion intermediate between the coefficients of thermal expansion of said inlet liner and said annular structure.

16. A turbine as claimed in claim 15, wherein said second axially-extending flexible mounting means is made of Nimonic, said inlet liner is made of austenitic steel having a higher coefficient of thermal expansion than Nimonic, and said annular structure is made of ferritic steel having a lower coefficient of thermal expansion than Nimonic.

17. A turbine as claimed in claim 8, wherein said member connected at its downstream end to said second axially-extending flexible mounting means and said inlet liner are made of austenitic steel having a higher coefficient of thermal expansion than Nimonic, said second axially-extending flexible mounting means is made of Nimonic, and said annular structure is made of ferritic steel having a lower coefficient of thermal expansion than Nimonic.

18. In a turbine the improvement as claimed in claim 2 further comprises:

said support means also including a member having an upstream end and a downstream end, the downstream end thereof being connected to said second axially-extending flexible mounting means and the upstream end thereof being engaged with said radially-inwardly-extending part of said radially-outer pressure-containing structure.

19. In a turbine the improvement as claimed in claim 1 further comprises:

a ring secured to the radially-outer pressure-containing structure and said first axially-extending flexible mounting means comprising a circumferentially-extending series of straps, each strap having one end welded to said inlet liner and the other end welded to said ring.

20. In a turbine the improvement as claimed in claim 4 further comprises:

a groove defined in said radially-inwardly-extending part, said annular structure being frusto-conical and being formed at its smaller-diameter end with a thick ring which is secured to said radially-inner structure, and said annular structure being formed at its larger-diameter end with a thickened end ring which is received in said groove.

21. In a turbine the improvement as claimed in claim 3 further comprises:

said gas-sealing means between the radially-inner wall means and said radially inner structure including a gas-sealing ring, and said second axially-extending flexible mounting means comprising a plurality of circumferentially-spaced axially-extending straps lying on the surface of a cone, one end of each of said straps being welded to said annular structure and the other end of each of said straps being welded to said gas-sealing ring.

22. In a turbine the improvement as claimed in claim 21, further comprises:

an annular sealing member mounted on said radially-inner structure and provided with an annular flange, and said gas-sealing ring being substantially of H-section, two arms of said H-section gas-sealing ring embracing said annular flange to form said gas-sealing means and the other two arms of said H-section gas-sealing ring being welded respectively to the radially-inner wall means and to the downstream ends of said circumferentially-spaced axially-extending straps.

23. In a turbine the improvement as claimed in claim 18, further comprises:

said member being a frustro-conical member to which the radially-inner wall means is welded, and which is formed at its larger-diameter end with a thick end ring, a groove is defined in said radially-inwardly-extending part and said thick end ring being received in said groove.

24. In a turbine the improvement as claimed in claim 3 further comprises:

said axially-extending flexible mounting means being made of a material having a coefficient of thermal expansion intermediate between the coefficients of thermal expansion of the material of said inlet liner and of the material of said annular structure.

25. In a turbine the improvement as claimed in claim 24 further comprises:

said second axially-extending flexible mounting means being made of Nimonic, said inlet liner being made of austenitic steel having a higher coefficient of thermal expansion than Nimonic, and said annular structure being made of ferritic steel having a lower coefficient of thermal expansion than Nimonic.

26. In a turbine the improvement as claimed in claim 5 further comprises:

said member and said inlet liner being made of austenitic steel having a higher coefficient of thermal expansion than Nimonic, and said second circumferentially-spaced series of axially-extending straps means being made of Nimonic, and said annular structure being made of ferritic steel having a lower coefficient of thermal expansion than Nimonic.

27. A turbine having casing means, said casing means including a radially-inner structure and a radially-outer pressure-containing structure; gas-inlet means formed in said radially-outer pressure-containing structure; a plurality of stator blades mounted within said casing means; a rotor comprising shaft means carrying rotor blades; means rotatably mounting said shaft means co-axially within said radially-inner structure; wherein the improvement comprises:

(1) An inlet liner having radially inner and outer wall means terminating adjacent said blades, said inlet liner defining an annular chamber, said annular chamber being in communication with said gas-inlet means and having a circumferentially continuous annular outlet defined by concentric downstream end portions of said radially inner and outer wall means for feeding working gas to said blades as a complete flow annulus.

(2) Gas sealing means between the downstream end of said inner wall means and said radially inner structure; and (3) Support means which support said inlet liner and which include first axially extending flexible mounting means connected between said radially-outer wall means and said radially-outer pressure-containing structure to allow relative thermal expansion of said inlet liner and said radially-outer pressure-containing structure in a radial direction, and second axially extending flexible mounting means connected between said radially-inner wall means and said casing means.

References Cited

UNITED STATES PATENTS

| | | | |
|---|---|---|---|
| 2,815,246 | 9/1958 | Nichols | 253—78 |
| 2,916,874 | 12/1959 | Worobel. | |

FOREIGN PATENTS

| | | |
|---|---|---|
| 1,107,456 | 5/1961 | Germany. |

EVERETTE A. POWELL, Jr., *Primary Examiner.*